United States Patent
Carmel

(10) Patent No.: US 9,544,728 B2
(45) Date of Patent: Jan. 10, 2017

(54) SYSTEMS AND METHODS FOR APPROXIMATING GEO-FENCING LOCATIONS

(71) Applicant: Guy Carmel, Rehovot (IS)

(72) Inventor: Guy Carmel, Rehovot (IS)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 13/839,708

(22) Filed: Mar. 15, 2013

(65) Prior Publication Data
US 2014/0274118 A1   Sep. 18, 2014

(51) Int. Cl.
*H04W 4/02* (2009.01)

(52) U.S. Cl.
CPC .................. *H04W 4/021* (2013.01)

(58) Field of Classification Search
CPC ........ H04W 56/00; H04W 4/02; H04W 4/021; H04W 4/025
USPC .............................. 455/456.1–457
See application file for complete search history.

(56) References Cited

U.S. PATENT DOCUMENTS

| | | | |
|---|---|---|---|
| 8,019,532 B2 | 9/2011 | Sheha et al. | |
| 8,731,585 B2 * | 5/2014 | Zarem | G01C 21/26 455/404.2 |
| 9,019,984 B2 * | 4/2015 | Grosman | H04M 1/72577 370/310.2 |
| 2002/0106069 A1 * | 8/2002 | Shaffer et al. | 379/207.12 |
| 2005/0159883 A1 * | 7/2005 | Humphries | B60R 25/00 701/517 |
| 2009/0093958 A1 | 4/2009 | Wang et al. | |
| 2009/0291630 A1 * | 11/2009 | Dunn et al. | 455/3.01 |
| 2010/0017126 A1 | 1/2010 | Holcman et al. | |
| 2010/0029299 A1 | 2/2010 | Riise et al. | |
| 2011/0112768 A1 | 5/2011 | Doyle | |
| 2011/0256881 A1 * | 10/2011 | Huang | G01S 5/0257 455/456.1 |
| 2015/0024773 A1 * | 1/2015 | Li | H04W 4/021 455/456.1 |

OTHER PUBLICATIONS

International Search Report and Written Opinion of International Application PCT/US2014/028520 dated Nov. 14, 2014. 16 pages.
Search Report for Taiwanese (R.O.C.) Patent Application No. 103107871 mailed Aug. 3, 2015. 1 page Taiwanese Office Action, 1 page English Translation.
Search Report from EP Application No. 014810540.6 mailed Oct. 24, 2016. (12 pgs.).

* cited by examiner

*Primary Examiner* — Marisol Figueroa
(74) *Attorney, Agent, or Firm* — Sutherland Asbill & Brennan LLP

(57) ABSTRACT

Systems and methods are described herein for determining whether a user device is within a geo-fenced region using lower powered location tracking techniques. In one instance, the user device may generate simplified versions of the geo-fenced regions to reduce the complexity for determining whether the user device is located within the geo-fenced regions.

20 Claims, 7 Drawing Sheets

| Region | East (X) | West (X) | North (Y) | South (Y) |
|---|---|---|---|---|
| 113 | 13.9 | 7 | 14 | 7 |
| 110 | 19.9 | 14.5 | 23 | 16 |
| 112 | 30 | 24 | 26 | 20 |
| 114 | 32 | 30.5 | 12 | 3 |

| User Device | East (X) | West (X) | North (Y) | South (Y) |
|---|---|---|---|---|
| 102 | 25 | 25 | 25 | 25 |

1000

```
┌─────────────────────────────────────────────────────────────────┐
│ DETERMINE ONE OR MORE GEOGRAPHIC REGIONS THAT ARE USED TO ENABLE A │
│  USER DEVICE TO RECEIVE OR SEND INFORMATION WHEN THE USER DEVICE IS │
│        LOCATED WITHIN AT LEAST ONE OF THE GEOGRAPHIC REGIONS        │
│                              702                                    │
└─────────────────────────────────────────────────────────────────┘
                                  │
                                  ▼
┌─────────────────────────────────────────────────────────────────┐
│ DETERMINE A MULTI-SIDED BOUNDARY THAT SURROUNDS EACH OF THE ONE OR │
│  MORE GEOGRAPHIC REGIONS, THE MULTI-SIDED BOUNDARY COMPRISING SIDES │
│      THAT ARE SUBSTANTIALLY PERPENDICULAR OR PARALLEL TO EACH OTHER │
│                              704                                    │
└─────────────────────────────────────────────────────────────────┘
                                  │
                                  ▼
┌─────────────────────────────────────────────────────────────────┐
│  DETERMINE A USER DEVICE IS LOCATED WITHIN THE MULTI-SIDED BOUNDARY │
│   AND OUTSIDE OF THE GEOGRAPHIC REGION ENCLOSED BY THE MULTI-SIDED  │
│                            BOUNDARY                                 │
│                              706                                    │
└─────────────────────────────────────────────────────────────────┘
                                  │
                                  ▼
┌─────────────────────────────────────────────────────────────────┐
│ RECEIVE OR SEND INFORMATION AT OR FROM THE USER DEVICE WHEN THE USER │
│  DEVICE IS LOCATED WITHIN THE MULTI-SIDED BOUNDARY AND OUTSIDE OF THE │
│   GEOGRAPHIC REGION ENCLOSED BY THE MULTI-SIDED BOUNDARY, THE       │
│        INFORMATION BEING RELATED TO THE GEOGRAPHIC REGION           │
│                              708                                    │
└─────────────────────────────────────────────────────────────────┘
```

FIG. 7

SYSTEMS AND METHODS FOR APPROXIMATING GEO-FENCING LOCATIONS

TECHNICAL FIELD

The embodiments described herein generally relate to location determination systems and methods for managing user devices within a geo-fencing environment.

BACKGROUND

A variety of location detection techniques or services are available for a variety of user devices. The location services may use different techniques or hardware to determine the location of a user device. Geographic or location boundaries may be established to provide information to user devices that are located within the boundaries. However, the user device may consume an undesirable amount of power and computing resources repeatedly attempting to determine whether the user device is located within the boundaries.

BRIEF DESCRIPTION OF THE FIGURES

The features within the drawings are numbered and are cross-referenced with the written description. Generally, the first numeral reflects the drawing number where the feature was first introduced, and the remaining numerals are intended to distinguish the feature from the other notated features within that drawing. However, if a feature is used across several drawings, the number used to identify the feature in the drawing where the feature first appeared will be used. Reference will now be made to the accompanying drawings, which are not necessarily drawn to scale and wherein:

FIG. 7 illustrates a flow diagram of another method for generating an approximate representation of a geo-fencing region in accordance with one or more embodiments of the disclosure.

DETAILED OF EMBODIMENTS

Figure 1:
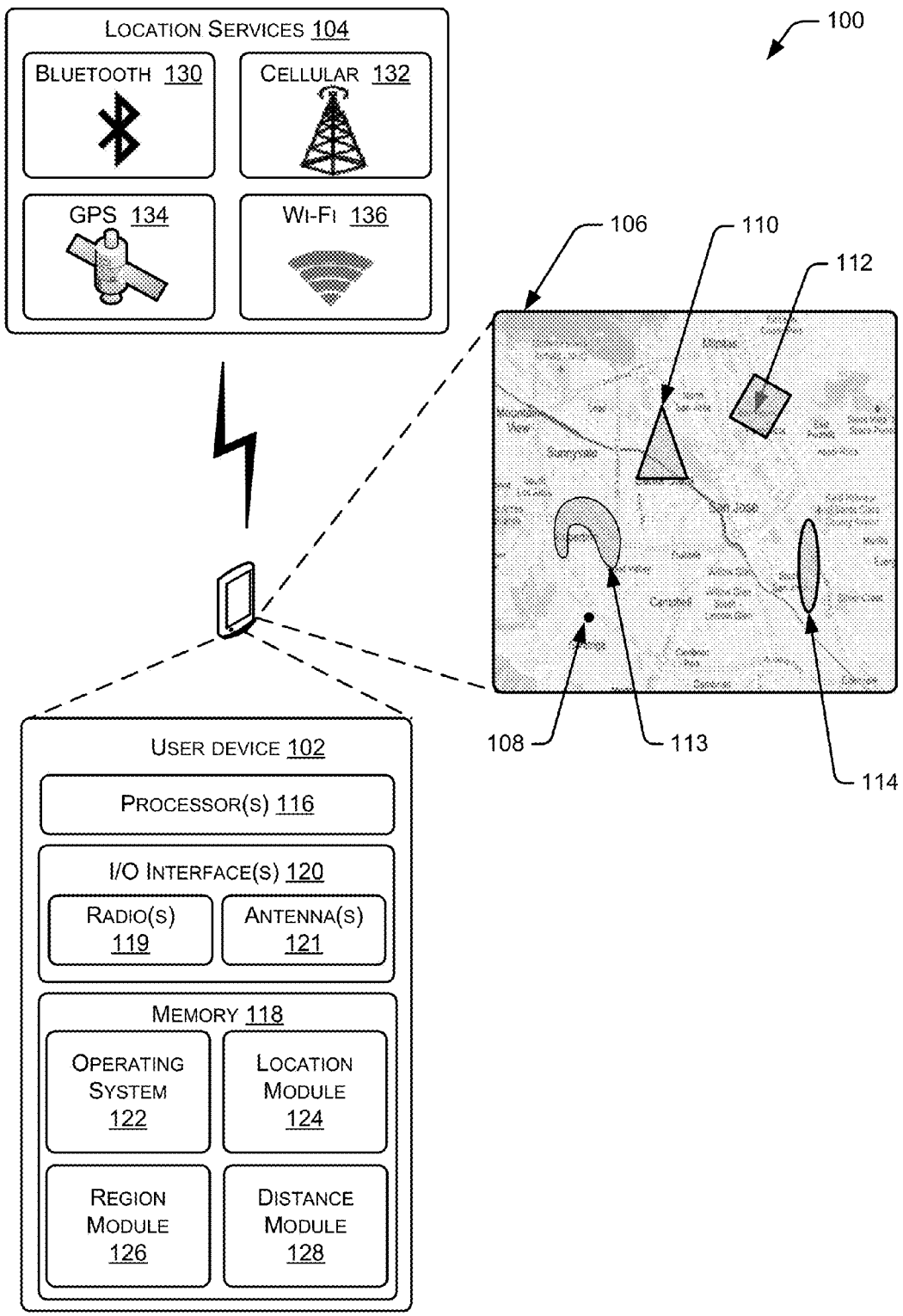
FIG. 1 illustrates a system that includes a user device that interacts with location services to determine the distances between the different locations of the user device in accordance with one or more embodiments of the disclosure.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

This disclosure may describe systems, methods, and devices for determining an approximate representation of geo-fencing regions that provides a user device with information related to the geo-fenced regions. The geo-fenced regions may be a designated geographic area that may enable a server or device to provide information to a user device that enters or is located within geographic area. For example, a user device may be carried into the geographic area by a user that is walking, riding, or driving through or in the geographic area. The server may determine the user device is within the geographic area and may send information related to the geographic area. However, when the user device leaves the geographic area, the server may discontinue sending the geographic area information to the user device.

As the complexity of the geo-fenced region increases, the accuracy of the location of the geo-fenced region and the user device may also increase which may increase the power and processor consumption on the user device. For example, the user device may execute a complex calculation to determine when the user device is within the geographic area. However, reducing the complexity of the user device location determinations may decrease the power and processor consumption of the user device. This may enable the mobile user device to increase the amount of usable time between power charging events.

In one embodiment, the complexity may be reduced by approximating a simplified shape for a complex shape of a geographic area. The approximate shape may be a square, rectangle, or any other shape that may have a less complex geometry than the geographic area.

In one embodiment, the user device may determine the maximum and minimum points in the vertical and horizontal axes of the geographic region. The maximum and minimum points may be connected by lines that are substantially perpendicular or parallel to each other. In this way, the lines may form a shape the surrounds or encloses the geographic area. The shape may be less complex than the geometry of the geographic area. The complexity may be lowered by reducing the amount of non-linearity found in the perimeter of the geographic area. Hence, the shape that surrounds the geographic area may a higher degree of linearity along the simplified shape than the original geographic area.

In one embodiment, the coordinates of the maximum and minimum points may be compared to the coordinates of the user device to determine whether the user device is close enough to the geographic region to perform a more accurate location determination. The coordinates for the user device may be compared against the maximum and minimum coordinate points to determine whether the user device may be close enough to the geographic area. When the coordinates are within the maximum and minimum coordinate points, the user device may initiate a comparison within the more complex geometry of the geographic area or implement geo-fencing information sharing. The user device may reduce power consumption by comparing the user device coordinates to the maximum and minimum coordinates that approximates the geographic area.

In one embodiment, the simplified shape may be generated by extending lines from the maximum and minimum points in the vertical or horizontal directions until they intersect with each other and form a shape that surrounds the geographic area. The location of the user device may be compared against the location of the shape to determine whether the user device is close enough to the geographic region to perform a more accurate location determination or to determine whether the user device is located within the more complex geographic area.

Example embodiments of the disclosure will now be described with reference to the accompanying figures.

Illustrative System

FIG. 1 illustrates a system 100 that may include a user device 102 that may use locations services 104 to generate a map 106 that includes a location 108 of the user device 102 and geographic regions (e.g., region 110, region 112, region 113, and region 114). When the user device 102 is within one of the geographic regions (e.g., region 110) the user device 102 may receive information related to the geographic region (e.g., region 110). However, maintaining constant location awareness may consume an undesirable amount of power or resources of the user device 102. Power consumption may be reduced by minimizing the amount of operations to determine the location of the user device 102, the location of the geographic regions (e.g., region 110, region 112, region 113, and region 114), and/or the comparison of the user device 102 location 108 to the geographic regions (e.g., region 110, region 112, region 113, and region 114).

The geographic regions (e.g., region 110, region 112, region 113, and region 114) may be represented by two dimensional shapes that may be overlaid on to a map 106. In other embodiments, the geographic region may be represented by a three-dimensional shape. The portions of the map 106 that may be covered by the geographic regions may indicate that those portions may be geo-fenced and the user device 102 may receive information related to any of the geographic regions in which the user device 102 may be located. The information may, for example, be related to businesses, schools, public transportation, or any other type of activity or organization that may be located within the geographic region. The information may include, but is not limited to, advertising, directions, schedules, business directory, weather, recommendations, business hours, ratings, and/or any other information that may be related to the geographic region. Determining the location of the geographic regions (e.g., region 110, region 112, region 113, and region 114) may be done by receiving the locations from a remote device (not shown). The remote device may be a server that may send the geographic region locations wirelessly or beacon devices (e.g., Wi-Fi access points) that may broadcast boundaries or coordinates of the geographic regions. In certain instances, the geographic regions (e.g., region 113) may include complex non-linear shapes. The higher degree of non-linearity may result in more calculations or operations to determine the boundaries of the geographic region or to determine that the user device 102 may be located within the geographic region. Hence, power consumption may be reduced by simplifying the geometry (e.g., reducing non-linearity) of the geographic regions. Further, the simplified geographic regions may be used to simplify the comparison of the user device location 108 to the geographic regions by comparing the maximum and minimum coordinates of the simplified geometry. These concepts and techniques may be described further in FIGS. 2-7.

The user device 102 may include, but is not limited to, smartphones, mobile phones, laptop computers, desktop computers, tablet computers, televisions, set-top boxes, game consoles, in-vehicle computer systems, and so forth. The user device 104 may include, but is not limited to, one or more processors 116, memory 118, and/or input/output (I/O) interfaces 120.

The processor 116 may execute computer-readable instructions stored in the memory 118 that enable the device to execute instructions on the hardware, applications, or services associated with the user device 102. The one or more processors 116 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. In certain embodiments, the processor 116 may be based on an Intel® architecture system, and the processor(s) 116 and chipset may be from a family of Intel® processors and chipsets, such as the Intel® Atom® processor family. The one or more processors 116 may also include one or more application-specific integrated circuits (ASICs) or application-specific standard products (ASSPs) for handling specific data processing functions or tasks.

The user device 102 may also include an input/output (I/O) interface 120 that enables a user to view content displayed by the device or to interact with the user device 102 using various tactile responsive interfaces such as a keyboard, a touch screen, or a mouse. The I/O interface 120 may also include a wireless system that may enable the user device 102 to communicate wirelessly with the location service 104. In certain embodiments, the wireless system may include one or more radios 119 and one or more antennas 121. The radio(s) 119 may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. One or more of the radios 119 also may be capable of operating in other operating frequencies and according to various wireless protocols, for example, Bluetooth™, cellular, and/or GPS.

The memory 118 may include an operating system 122 to manage and execute applications stored therein as well as other systems and modules within the user device 102. The memory 118 may be comprised of one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof. The memory 118 may include, but is not limited to, a location module 124, a region module 126, and a distance module 128.

The location module 124 may collect location information from the location services 104 to determine the location of the user device 102 and to track the changes in location of the user device 102. The location module 124 may receive location information that may be collected by the wireless systems of the I/O interfaces. The location information may be received from a variety of location services 104 that may include, but are not limited to, personal area networks 130 (e.g., Bluetooth™), cellular networks 132, GPS networks 134, and/or Wi-Fi networks 136. Broadly, the location services may provide location information from multiple sources that may be used to determine the location of the user device 102. For example, the concept of triangulation may be used when three or more sources of a location service 104 may be used to calculate the location of the user device. In one instance, the location information may include the known location information that may be used to determine the location of the user device 102. In one embodiment, the location information may be used to determine the latitude, longitude, and elevation of the user device 102. The location 108 may be determined using the above techniques to provide an accurate location of the user device 102. The location services will be discussed below in the description of FIG. 1.

In one embodiment, the user device 102 may use the relatively complex location determination each time to confirm the user device 102 is within the geographic region (e.g., region 110). However, the power consumed using this technique may be prohibitive to maintaining battery life. Additional techniques will be discussed in the discussion of the region module 128 below. But first, the user device 102 may determine the location of the geographic regions (e.g., region 110, region 112, region 113, and/or region 114).

The region module 126 may receive information that may define the geographic boundaries of the geographic region (e.g., region 110, region 112, and region 114). The information may be received from network server (not shown) or another remote device (not shown) for the geographic region (e.g., region 110). The location information may indicate a single point location with a radius that may cover the geographic region (e.g., region 114). For example, region 114 may include a coordinate point at the center of the circle and may indicate a radius around that point that covers the effective region of region 114. The effective region being the area in which the user device 102 may receive or send information related to the region. The information or regional information may include, but is not limited to, traffic, advertising, safety, and/or directions to a location within the region. The traffic information may indicate traffic congestion or other traffic conditions or availability (e.g., high occupancy vehicle lanes). The information may also include advertising for nearby retailers or restaurants that may attempt to draw customers who are nearby the stores. Safety information may warn the user of nearby hazards in a building or warehouse that may require the use of personal protective equipment. The safety information may also warn users when a fire or leak has occurred nearby in the building or warehouse.

In another embodiment, the region 114 may provide coordinate information for the perimeter of the circle. The coordinate information may include two or more coordinate points that may indicate the perimeter of the region 114. For example, the circle for region 114 may include four or more points spread across the circumference of the circle. When the user device 102 is located within the region 114 defined by the coordinate points, the user device 102 may receive information associated with the region 114. In this way, the geographic boundary information may provide a threshold that when crossed may enable the user device 102 to receive information associated with the region. As the number of coordinate points increase, the resolution of the geographic boundary may become better defined and may more clearly define the area of the region 114. However, the higher resolution may use more processing resources and more power.

In another embodiment, the region 113 may include a complex region that may include a high degree of non-linearity. For example, region 113 may include a curved perimeter boundary that may be represented by a high order mathematical function. The user device 102 may consume more power determining or analyzing the perimeter of region 113 than region 114 due to the higher degree of non-linearity in region 113.

In another embodiment, the region 114 may include an elliptical region that may be defined by four or more coordinate points. In one embodiment, the elliptical region 114 may include four coordinate points on the perimeter of the region 114 where the curvature of the ellipse is either maximized or minimized along the major and minor axes. In this instance, the oblong ends of the region 114 may include two coordinate points at each end along the major axis. The remaining two points may be along the minor axis that is perpendicular to the major axis. Additional coordinate points may be assigned to the perimeter of the region 114 using the foci of the ellipse that are two points within the region 114 on the major axis and that are equidistant from the center of the region.

In another embodiment, the region 110 may include a free form region that, as a whole, may not conform to an easily recognizable shape. However, the region 110 may be subdivided into smaller recognizable shapes like, but not limited to, a circle, square, triangle, and/or an ellipse to assign coordinates along the perimeter of the region 110. In another instance, the coordinates may be assigned based on known coordinates of latitude and longitude. Hence, the reliance on a mathematical assignment of the coordinates from a central location(s) may not be required. The free form coordinates may be determined using mapping software that may define the coordinates based on regions that are drawn on a map or that receive instructions on where the region 110 should cover by listing addresses or known locations for the scope of the region 110. They coordinates may also be assigned by selecting a known location such as one or more buildings, a neighborhood, a residential sub-division, a school, a work site, a tourist area, a shopping area, a recreation area, and/or a place of residence. In these examples, the coordinates may already be known or may be determined by the mapping software stored in the region module 126 or generated by a remote device or network server that provide the information to the user device 102.

When the regions 110, 112, 113, 114 are defined the user device 102 may execute computer-executable instructions to determine the minimum distance between the location 108 of the user device 102 and the nearest portion of each of the regions. In another embodiment, the portion may include the nearest known coordinate of the regions 110, 112, 113, 114. The nearest known coordinate may located on the perimeter of the region 110 or located within the perimeter of the region 110.

The distance module 128 may determine the minimum distance to the one or more regions 110, 112, 113, 114 and track the distance of the user device 102 travels between locations over time. The minimum distance determination may include measuring distance in absolute values that are independent of the direction of the vector from the user device 102 at its initial location 108 to the nearest coordinate point of the regions 110, 112, 113, 114. In one embodiment, the minimum distance is the straight line distance between the initial location 108 and the regions 110, 112, 113, 114. The straight line distance may be the horizontal distance between the initial location 108 and the regions 110, 112, 113, 114 and may not include the elevation differences between the initial location 108 and the regions 110, 112, 113, 114. The minimum distance may be stored in memory 118 recalled when the user device 102 moves from the initial location 108.

When the user device 102 moves to a second location (not shown), the distance module 128 may determine the gap distance between the initial location 108 and the second location. The gap distance may include the absolute value of a straight line distance between the initial location 108 and the second location. In this instance, the gap distance may include the horizontal distance between the initial location 108 and the second location, which may not include the distance associated with changes in elevation between the initial location 108 and the second location.

The distance module 128 may determine the user device 102 has a strong likelihood of being within one of the regions 110, 112, 113, 114 when the difference between the gap distance and the minimum distances are less than or equal to zero. In this instance, the region module 128 may direct the location module 124 to determine an accurate location of the user device 102 to confirm the user device 102 is within one of the regions. However, when the difference between the gap distance and the minimum distances are greater than zero the user device 102 has a lower likelihood of being within one of the regions 110, 112, 113, 114. In this case, the distance module 128 may update the minimum distances by subtracting the gap distance from the prior minimum distances to generate an updated minimum distance. The updated minimum distance may provide an indication of the minimum distance from the user device 102 to the one or more regions 110, 112, 113, 114. The updated minimum distance may independent of the orientation or direction of the gap distance vector. Hence, the magnitude of the gap distance vector is of primary concern regarding in the updated minimum distance calculation.

In another embodiment, the user device may determine the maximum and minimum coordinate points of the regions 110, 112, 113, 114. The user device 102 may determine the farthest points that each of the regions extends in one or more directions. Within the context of the coordinate system that may include a horizontal and vertical axis, the user device 102 may determine a maximum point for the horizontal axis, a maximum point for the vertical axis, a minimum point for the horizontal axis, and a minimum point for the vertical axis. The user device 102 may quickly determine that the likelihood that the user device 102 is within one of the regions is high, when the location of the user device 102 falls in between the maximum and minimum coordinate points. Hence, the user device 102 may use less power than determining the coordinates of the perimeter of a non-linear region (e.g., region 113) and determining whether the user device 102 is located within the non-linear region 113.

The location services 104 may include, but are not limited to, a global positioning system (GPS) network 134 (e.g., a satellite network), a Wi-Fi network 136 (e.g., an access point network), a cellular network 132, or a Bluetooth network 130 (e.g., a personal area network). More broadly, the location services 104 may pertain to any system or device that may provide any type of signal or information that may be used, either by itself or in conjunction with other information or signals, to enable the user device 104 to determine its location.

The global positioning system 134 may include any satellite-based system that may be used to provide location information to the user device 102. The satellite network (not shown) may include one or more satellites that transmit signals towards the surface of the earth. The signals may include the location of the satellite or the relative position of the satellite to the earth and a time of transmission from the satellite. The user device 102 may receive one or more of the transmissions from one or more satellites. The location and timing information may be used to determine the location of the user device 102.

The satellite network may include a global service availability based on the satellites that are orbiting the earth on a continuous basis. The location accuracy of the satellite network service may be within a few meters between the determined location and the real location of the user device 102.

The Wi-Fi network 136 may include access points (not shown) that send wireless signals to the user device 102. The Wi-Fi network 136 may include one or more access points that may be at a known location(s). The access point may send wireless signals that may include location information of the access point and the time that the transmission was sent. The user device 102 may use that information to determine its location. In another embodiment, the user device 102 may send a signal to one or more access points that may use that information to determine the location of the user device 102 relative to the access points. The location determination may include triangulation techniques that may include three or more access points. However, in certain instances, fewer access points may be available, which may result in the location accuracy being lower. In contrast, when larger amounts of access points are triangulating the location, the location accuracy may be higher.

The cellular network 132 may include several radio transceivers distributed over a geographic area that provides voice and data communications for mobile devices (e.g., user device 102). Generally, depending upon the geography, the transceivers may be several kilometers apart. The transceivers may provide overlapping service areas to provide consistent communications service over the geographic area. In certain instances, the transceivers may be used to determine the location of the user device 102 based, at least in part, on receiving signals from the user device 102. In this way, the location of the user device 102 may be determined, but the location accuracy may be low. For example, when only one transceiver detects the user device 102, the location accuracy may be as large as the service area of the transceiver. The service area may be several square kilometers. In another instance, when several transceivers detect the signal from the user device 102, the location accuracy may be improved to within several meters. The information received at or from the transceivers may be used to triangulate the location of the user device 102.

The Bluetooth network 130 (e.g., a personal area network) may include wireless devices that may transmit and receive signals over a short distance (e.g., 10 meters). Typically, the Bluetooth devices may be tethered on networks with another device that may have a larger transmission range or that may be coupled to a network via a landline connection. Bluetooth devices that may be coupled to a fixed landline may be a known location. When the user device 102 is within the broadcast range of the Bluetooth device, the location accuracy may be 10 meters. However, when the user device 102 may be in communication with several Bluetooth devices, the location accuracy may improve based on the triangulation techniques described above. In one embodiment, the Bluetooth device may be tethered to another mobile device; hence, the location accuracy of the Bluetooth network 130 may be dependent on whether the mobile device (not shown) is enabled to determine its location or knows its own location through other means. In this instance, the Bluetooth network 130 may be dependent upon another network (e.g., a cellular network) to determine the location of the user device 102.

Illustrative Methods

Figure 2:
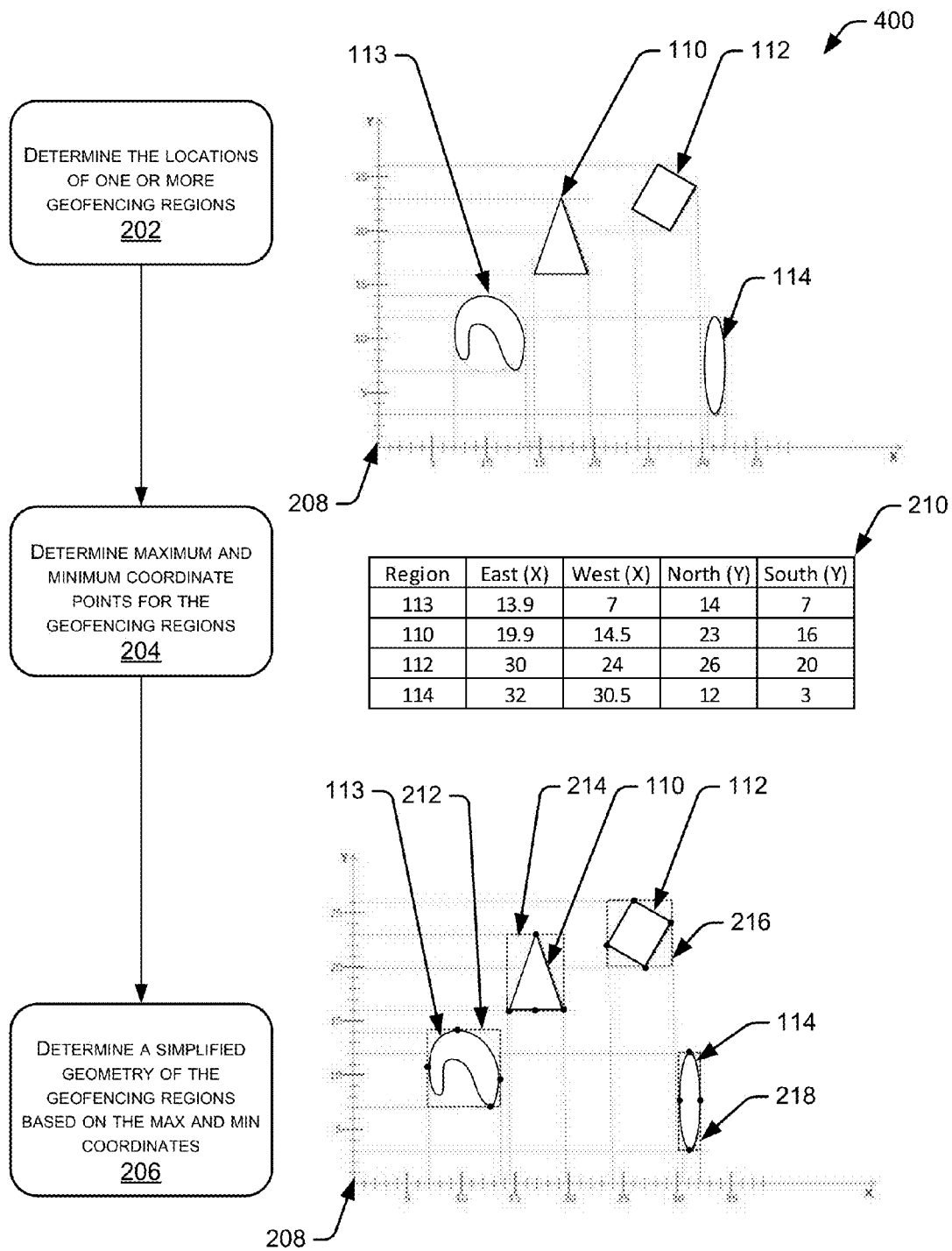
FIG. 2 illustrates a flow diagram with accompanying illustrations for a method for generating a multi-sided boundary region that approximates a geo-fenced geographic region in accordance with one or more embodiments of the disclosure.

FIG. 2 illustrates a flow diagram with accompanying illustrations of a method 200 for generating multi-sided boundary regions that approximates the geo-fenced geographic regions (e.g., regions 110, 112, 113, 114). In this way, the multi-sided boundary regions may be decrease the non-linearity of the geographic regions to decrease the amount of operations to determine whether the user device 102 is within or nearby the geographic regions. Reducing the amount of operations may reduce power consumption over time. For example, the user device 102 may verify whether the user device is located within the multi-sided boundaries several times a minute.

At block 202, the user device 102 may determine the locations of the geographic regions 110, 112, 113, 114. The location information may be arranged accordingly to a horizontal/vertical coordinate system 208 that may include a horizontal axis (e.g., x-axis) and a vertical axis (e.g., y-axis) that enable the user device to determine the perimeters of the geographic regions. However, the coordinate points for the perimeters may be quite large or the mathematical function for the perimeters may be very complex. Hence, a simplified model of the geographic regions may be desirable to reduce power and processor resources.

At block 204, the user device 102 may determine the maximum and minimum coordinate points for each of the geographic regions. The coordinate table 210 may include the numerical representations of the maximum and the minimum points of each of the regions. The maximum and minimum points may represent the furthest extent that the one or more geographic regions may cover in the horizontal and vertical directions of a coordinate system 208. For example, the one or more regions may include a maximum horizontal coordinate, a maximum vertical coordinate, a minimum horizontal coordinate, and a minimum vertical coordinate. One or more remote devices (not shown) that manage the geo-fenced regions (e.g., region 113) may provide the maximum and minimum coordinates or the user device 102 may determine the maximum and minimum coordinates based information provided by the one or more remote devices. In the FIG. 2 embodiment, the coordinates may be based on north, south, east, and west coordinates as shown in coordinate table 210. However, additional coordinate systems may also be used, such as latitude and longitude coordinates.

At block 206, the user device may determine a simplified geometry for the geo-fenced regions (e.g., regions 110, 112, 113, 114) that enables the user device 102 to minimize the amount of calculations to determine when the user device is within or near the geo-fenced regions. For example, the user device 102 may generate a square or rectangle geometry based on the maximum and minimum coordinates, as shown in the illustration next to block 206 in FIG. 2. Each of the geo-fences regions (e.g., regions 110, 112, 113, 114) have a corresponding simplified geometry region (e.g., simple regions 212, 214, 216, 218). The user device 102 may approximate the geo-fence regions (e.g., region 110, etc.) determining extending lines from the maximum and minimum coordinate points and determining where they intersect with each other to form the boundary of the simple regions 212, 214, 216, 218. When the user device location 108 is located within at least one of the simple regions 212, 214, 216, 218 the user device 102 may implement geo-fencing protocols, implement additional location determination capabilities to confirm the user device 102 is within the geo-fenced region (e.g., region 110), or just nearby the geo-fenced region.

In another embodiment, the user device 102 may compare the coordinates of the user device location 108 with the coordinate table to determine when the user device location 108 coordinates are within the range of the maximum and minimum horizontal coordinates and the maximum and minimum vertical coordinates. The concepts described in the description of FIG. 2 will be elaborated upon in the description of FIGS. 3-5.

Figure 3:
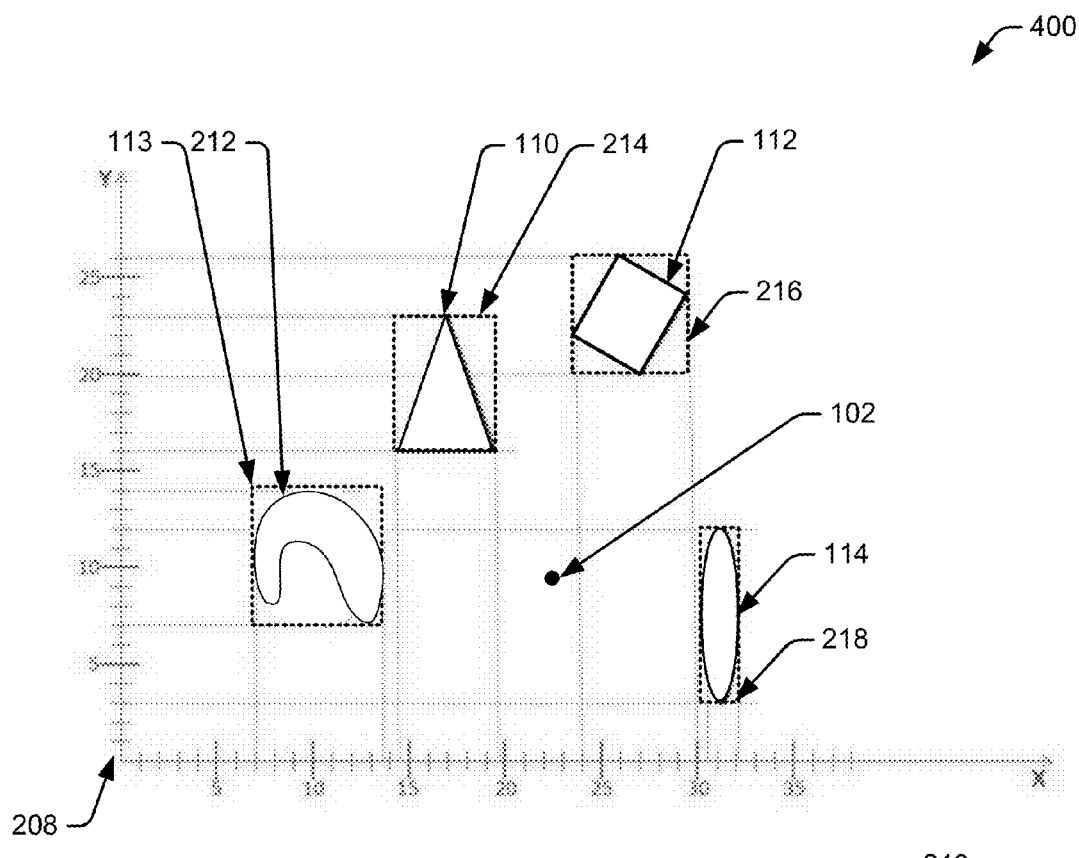
FIG. 3 illustrates a flow diagram of another method for determining the likelihood that the user device is within a geographic region in accordance with one or more embodiments of the disclosure.

FIG. 3 illustrates a schematic diagram 300 of a user device 102 that may be outside of the geo-fencing regions (e.g., regions 110, 112, 113, 114) and may be used for determining the likelihood that the user device 102 is within a geographic region. In this embodiment, the location of the user device 102 may be compared to the coordinates 210 to determine when the user device 102 within or nearby the geo-fencing regions (e.g., regions 110, 112, 113, 114). The coordinates 302 for the user device 102 may include horizontal and vertical components that may indicate the relative location of the user device 102 to the geo-fencing regions (e.g., regions 110, 112, 113, 114).

In this embodiment, the user device 102 may compare the maximum and minimum coordinates of the geo-fencing regions (e.g., regions 110, 112, 113, 114) to the coordinates 302 of the user device 102. With regard to region 110, the maximum horizontal coordinate may be 19.9 and the minimum horizontal component may be 14.5. Since the horizontal coordinate for the user device 102 may be 23, the user device 102 is not likely within the region 110 since horizontal coordinate may not be within the range of 14.5-19.0. The user device 102 may move to the next region 112 or may confirm the user device 102 may not be within the maximum and minimum ranges of vertical components for region 110.

With regard to region 112, the maximum horizontal coordinate may be 30.0 and the minimum horizontal component may be 24.0. Since the horizontal coordinate for the user device 102 may be 23, the user device 102 is not likely within the region 112 since horizontal coordinate may not be within the range of 24.0-30.0. The user device 102 may move to the next region 113 or may confirm the user device 102 may not be within the maximum and minimum ranges of vertical components for region 112.

With regard to region 113, the maximum horizontal coordinate may be 13.9 and the minimum horizontal component may be 7.0. Since the horizontal coordinate for the user device 102 may be 23, the user device 102 is not likely within the region 113 since the horizontal coordinate may not be within the range of 7.0-13.9. The user device 102 may move to the next region 114 or may confirm the user device 102 may not be within the maximum and minimum ranges of vertical components for region 113.

With regard to region 114, the maximum horizontal coordinate may be 32.0 and the minimum horizontal component may be 30.5. Since the horizontal coordinate for the user device 102 may be 23, the user device 102 is not likely within the region 114 since horizontal coordinate may not be within the range of 30.5-32.0.

In this embodiment, when the user device 102 may not likely be within any of the geo-fenced regions (e.g., regions 110, 112, 113, 114), as shown above. The user device 102 may not implement any additional location determinations to confirm the accuracy of the simplified geometry approximations or geo-fencing instructions or protocols.

Figure 4:
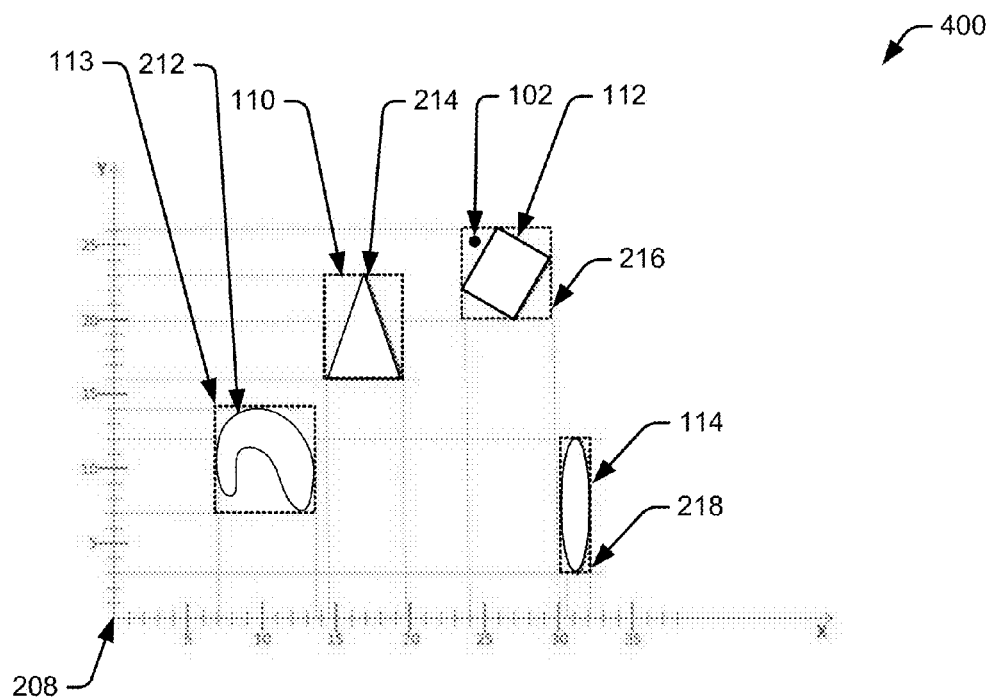
FIG. 4 illustrates a schematic diagram of user device within a simplified representation of a geo-fencing region in accordance with one or more embodiments of the disclosure.

FIG. 4 illustrates a schematic diagram 400 of user device 102 within a simplified representation of a geo-fencing region 112. The user device 102 may implement a location determination to determine the coordinates 402 of the user device with regard to the geo-fencing regions (e.g., regions 110, 112, 113, 114). The coordinates 402 may be compared to the maximum and minimum coordinates 210 of the geo-fencing regions (e.g., regions 110, 112, 113, 114).

With regard to region 110, the maximum horizontal coordinate may be 19.9 and the minimum horizontal component may be 14.5. Since the horizontal coordinate for the user device 102 may be 23, the user device 102 is not likely within the region 110 since horizontal coordinate may not be within the range of 14.5-19.0. The user device 102 may move to the next region 112 or may confirm the user device 102 may not be within the maximum and minimum ranges of vertical components for region 110.

With regard to region 112, the maximum horizontal coordinate may be 30.0 and the minimum horizontal component may be 24.0. Since the horizontal coordinate for the user device 102 may be 25, the user device 102 may likely be within the region 112 since horizontal coordinate may be within the range of 24.0-30.0. The user device 102 may compare the vertical component of the user device coordinates 402, 25, to the maximum and minimum vertical range of the region 112, 20.0-26.0. In this instance, the vertical coordinates of the user device 102 may also be within the ranges of both the maximum and minimum ranges of the vertical and horizontal components of the simplified region 214. The user device 102 may implement geo-fencing protocols or implement additional location determinations to confirm the user device 102 may also be within the region 112. In this instance, the comparison of the user device coordinates 402 may indicate that the user device 102 may not be within the region 112. Hence, the user device 102 may not implement the geo-fencing protocols to communicate with a remote device that manages the geo-fencing information for the region 112.

Figure 5:
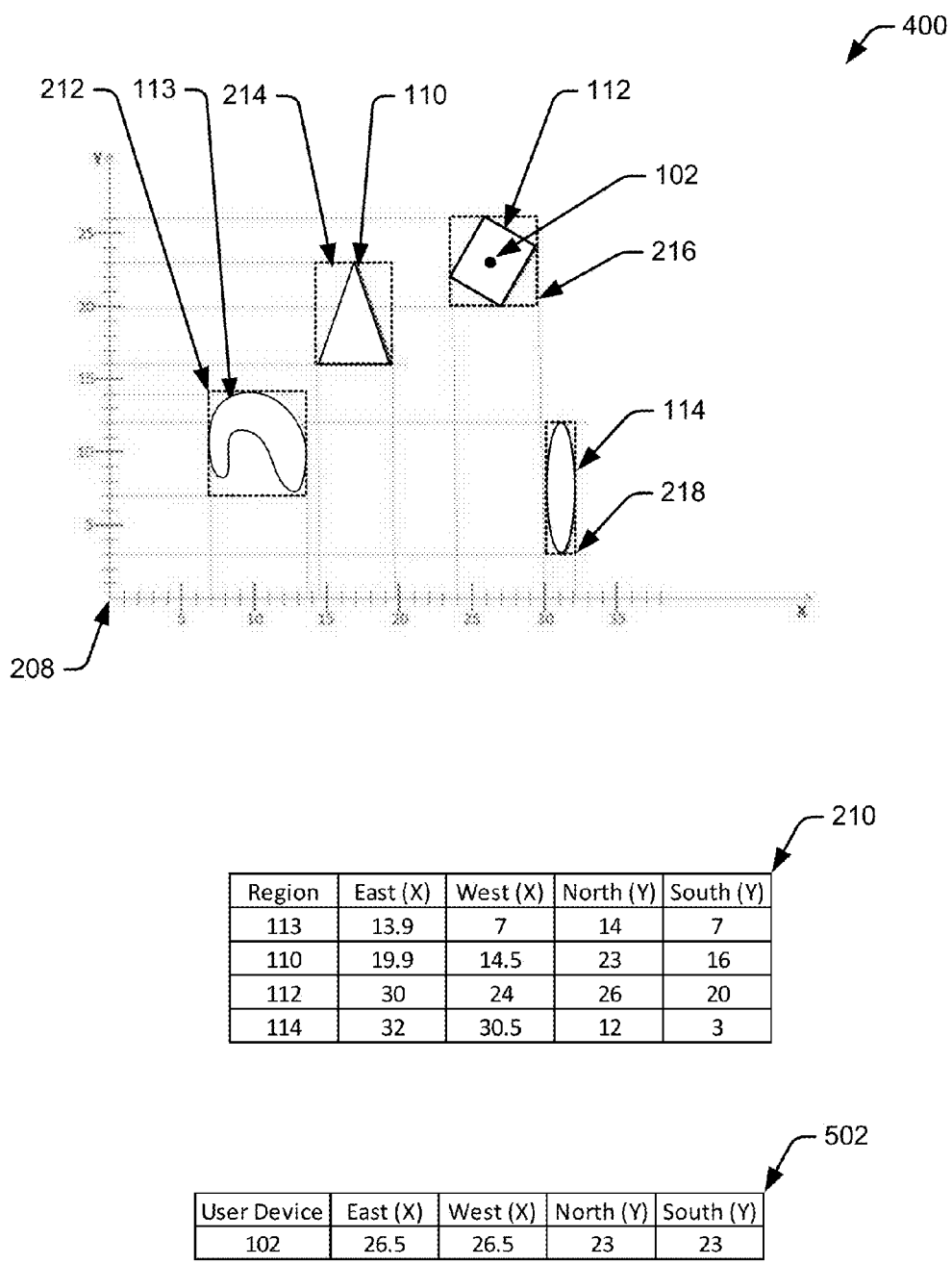
FIG. 5 illustrates a schematic diagram of user device within a simplified representation of a geo-fencing region and a geo-fencing region in accordance with one or more embodiments of the disclosure.

FIG. 5 illustrates a schematic diagram 500 of user device 102 within a simplified representation 216 of a geo-fencing region 112 and the geo-fencing region 112. The user device 102 may implement a location determination to determine the coordinates 402 of the user device 102 with regard to the geo-fencing regions (e.g., regions 110, 112, 113, 114). The coordinates 402 may be compared to the maximum and minimum coordinates 210 of the geo-fencing regions (e.g., regions 110, 112, 113, 114).

With regard to region 110, the maximum horizontal coordinate may be 19.9 and the minimum horizontal component may be 14.5. Since the horizontal coordinate for the user device 102 may be 23, the user device 102 is not likely within the region 110 since horizontal coordinate may not be within the range of 14.5-19.0. The user device 102 may move to the next region 112 or may confirm the user device 102 may not be within the maximum and minimum ranges of vertical components for region 110.

With regard to region 112, the maximum horizontal coordinate may be 30.0 and the minimum horizontal component may be 24.0. Since the horizontal coordinate for the user device 102 may be 26.5, the user device 102 may likely be within the region 112 since horizontal coordinate may be within the range of 24.0-30.0. The user device 102 may compare the vertical component of the user device coordinates 402, 23, to the maximum and minimum vertical range of the region 112, 20.0-26.0. In this instance, the vertical coordinates of the user device 102 may also be within the ranges of both the maximum and minimum ranges of the vertical and horizontal components of the simplified region 214. The user device 102 may implement geo-fencing protocols or implement additional location determinations to confirm the user device 102 may also be within the region 112. In this instance, the comparison of the user device coordinates 402 may indicate that the user device 102 may be within the region 112. Hence, the user device 102 may implement the geo-fencing protocols to communicate with a remote device that manages the geo-fencing information for the region 112.

Figure 6:
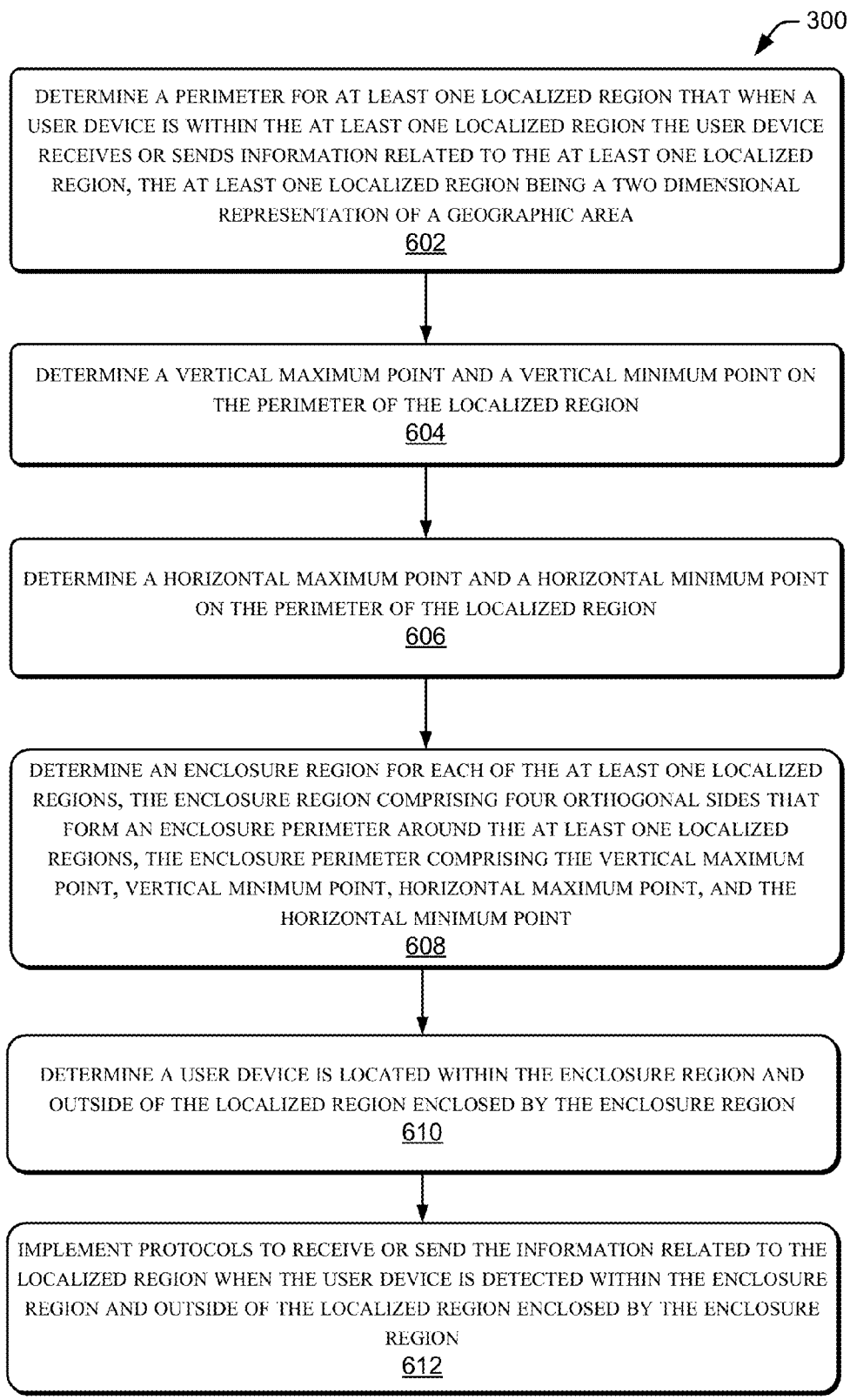
FIG. 6 illustrates a flow diagram of a method for generating an approximate representation of a geo-fencing region in accordance with one or more embodiments of the disclosure.

FIG. 6 illustrates a flow diagram of a method 600 for generating an approximate representation (e.g., simplified region 214) of a geo-fencing region (e.g., region 112). The user device 102 may use the simplified region 214 to reduce the calculation complexity to determine when the user device 102 is likely to be located within the geo-fencing region (e.g., region 112). The method 600 represents one embodiment and other embodiments may omit or rearrange the order to the operations in the method 600.

At block 602, the user device 102 may determine a perimeter for at least one localized region (e.g. region 112). When a user device 102 is within the localized region, the user device 102 may receive or send information related to the at least one localized region. The localized region may be part of a map 106 that may be a two dimensional representation of a geographic area. The two dimensional representation may include a vertical axis and a horizontal axis along with a coordinate system 208 that may detail the location of the user device 102 and the one or more localized regions relative to each other, as shown in FIG. 2.

The localized regions may include areas that local businesses and/or organizations that may broadcast information to nearby user device 102. The businesses and/or organizations may include, but are not limited to, a business, a school, a retailer, a neighborhood, or a commercial zone that may broadcast information that may be useful to nearby users. The information may include, but is not limited to, operating hours, directions to a location, and/or advertising for products and/or services.

At block 604, the user device 102 may determine a vertical maximum point and a vertical minimum point on the perimeter of the localized region. In this instance, the vertical maximum point may include a location in which any portion of the at least one localized region that does not extend beyond in a direction of the vertical axis. Accordingly, the vertical minimum point may include a location which any portions of the at least one localized region that does not extend beyond in the opposite direction of the vertical axis. For example, the vertical axis may include the latitude of the vertical maximum point and the vertical minimum point. Hence, a localized region may be reflected by the range of latitude coordinates illustrated by the vertical maximum and minimum points.

At block 606, the user device 102 may determine a horizontal maximum point and a horizontal minimum point on the perimeter of the localized region. In this instance, the horizontal maximum point may a location on the perimeter of the at least one localized region in which any portion of the at least one localized region that does not extend beyond in a direction of the horizontal axis. The horizontal minimum point comprises a location on the perimeter of the at least one localized region in which any portion of the at least one localized region that does not extend below in the opposite direction of the horizontal axis. The maximum and minimum horizontal points may be reflected in longitude coordinates or any other coordinate system that represents a horizontal axis. The range of longitudinal coordinates illustrated by the vertical maximum and minimum points may reflect a localized region.

At block 608, the user device 102 may determine an enclosure region (e.g., simplified region 214) for each of the at least one localized regions. The enclosure region may include four orthogonal sides that form an enclosure perimeter around the at least one localized regions. The enclosure perimeter may include lines that intersect the vertical maximum point, vertical minimum point, horizontal maximum point, and the horizontal minimum point. The four orthogonal sides may form a square or a rectangle around the localized region.

In another embodiment, the four orthogonal sides may be substantially perpendicular or parallel to each other and may not be absolutely orthogonal.

At block 610, the user device 102 may determine that the user device 102 is located within the enclosure region (e.g., simplified region 216) and outside of the localized region (e.g., region 112) that may be enclosed by the enclosure region.

At block 612, the user device 102 may implement protocols to receive or send the information related to the localized region when the user device 203 may be detected within the enclosure region and outside of the localized region enclosed by the enclosure region.

In another instance, when the user device 102 moves to another location, the user device 102 may determine that the user device 102 may be located outside of the enclosure region that surrounds the at least one localized region. In this case, the user device 102 may cease the implementation of the protocols to receive or send the information related to the at least one localized region.

FIG. 7 illustrates a flow diagram of another method 700 for generating an approximate representation (e.g., simplified region 214) of a geo-fencing region (e.g., region 112). The approximate representation may be used to minimize the complexity for determining whether the user device 102 may be located with the geo-fencing region.

At block 702, the user device 102 may determine one or more geographic regions may be located nearby that may be used in a geo-fencing network (e.g., map 106). The user device 102 may receive or send information from or to a remote device when the user device 102 is located within at least one of the geographic regions At block 704, the user device 102 may determine or generate a multi-sided boundary (e.g., simplified region 214) that surrounds each of the one or more geographic regions. The multi-sided boundary may include sides that are substantially perpendicular or parallel to each other. For example, the multi-sided boundary may include a square or a rectangle.

At block 706, the user device 102 may determine that the user device 102 is located within the multi-sided boundary and outside of the geographic region enclosed by the multi-sided boundary. This embodiment is illustrated in FIG. 4 and is discussed in greater detail above in the description of FIG. 4.

At block 708, the user device 102 may receive or send information at or from the user device when the user device is located within the multi-sided boundary and outside of the geographic region enclosed by the multi-sided boundary, the information being related to the geographic region In another embodiment, a system may include at least one memory that stores computer-executable instructions and at least one processor that executes the computer-executable instructions. The instructions may enable the system to determine a perimeter for at least one localized region that when a user device associated with the system is within the at least one localized region the user device receives or sends information related to the at least one localized region, the at least one localized region associated with a representation of a geographic area, determine a vertical maximum point and a vertical minimum point on the perimeter of the localized region, determine a horizontal maximum point and a horizontal minimum point on the perimeter of the localized region, determine an enclosure region for each of the at least one localized regions, the enclosure region comprising an enclosure perimeter around the at least one localized regions, the enclosure perimeter comprising the vertical maximum point, vertical minimum point, horizontal maximum point, and the horizontal minimum point, determine a user device is located within the enclosure region and outside of the localized region enclosed by the enclosure region, and/or implement protocols to receive or send the information related to the localized region when the user device is determined to be within the enclosure region and outside of the localized region enclosed by the enclosure region.

The system may further include computer-executable instructions to determine the user device is located outside of the enclosure region and cease the implementation of the protocols in response to determining the user device is determined to be outside of the enclosure region. The system may also determine the user device is located again inside of the enclosure region and implement the protocols in response to determining the user device is determined to be inside of the enclosure region.

In one embodiment, the representation of the geographic area comprises a two dimensional representation, and the two dimensional representation comprises a vertical axis and a horizontal axis and the vertical maximum point comprises a location on the perimeter of the at least one localized region in which any portion of the at least one localized region that does not extend beyond in a direction of the vertical axis.

In another embodiment, the horizontal maximum point comprises a location on the perimeter of the at least one localized region in which any portion of the at least one localized region that does not extend beyond in a direction of the horizontal axis. The vertical minimum point comprises a location on the perimeter of the at least one localized region in which any portion of the at least one localized region that does not extend below in a direction of the vertical axis. The horizontal minimum point comprises a location on the perimeter of the at least one localized region in which any portion of the at least one localized region that does not extend below in a direction of the horizontal axis. In one instance, the four orthogonal sides form a square or a rectangle that encloses the localized region.

In one embodiment, the localized region comprises an area including a business, a school, a retailer, a neighborhood, or a commercial zone.

In another embodiment, one or more tangible computer-readable non-transitory storage media comprising computer-executable instructions operable to, when executed by at least one computer processor, enable the at least one computer processor to implement a method to: determine using the at least one computer processor, one or more geographic regions that are used to enable a user device to receive or send information when the user device is located within at least one of the geographic regions, determine a multi-sided boundary that surrounds each of the one or more geographic regions, the multi-sided boundary comprising sides that are substantially perpendicular or substantially parallel to each other, determine a user device is located within the multi-sided boundary and outside of the geographic region enclosed by the multi-sided boundary, and/or receive or send information at or from the user device when the user device is located within the multi-sided boundary and outside of the geographic region enclosed by the multi-sided boundary, the information being related to the geographic region.

The embodiment may also include determining the user device is located outside of the multi-sided boundary that surrounds the geographic region and ceasing the sending, from the user device, of the information related to the geographic region when the user device is detected outside of the multi-sided boundary.

The embodiment may also include determining the user device is located inside of the geographic region and maintaining the receiving or sending of the information when the user device is detected inside of the geographic region.

The embodiment may also include multi-sided boundary forms a four or more sided feature that enclose the geographic region and the four or more sided feature may comprise a square or a rectangle.

In one embodiment, the geographic region comprises a designated area for a remote device to provide information to the user device when the user device is located within the designated area.

In another embodiment, a device may be enabled to perform the instructions described above in the computer-executable instructions embodiment.

CONCLUSION

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions, which have been employed herein, are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure, including the best mode, and to enable any person skilled in the art to practice certain embodiments of the disclosure, including making and using any devices or systems and performing any incorporated methods. The patentable scope of certain embodiments of the disclosure is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:
1. A system comprising:
at least one memory that stores computer-executable instructions; and
at least one processor that executes the computer-executable instructions to:
determine a perimeter for at least one localized region that when a user device associated with the system is within the at least one localized region the user device receives or sends information related to the at least one localized region, the at least one localized region associated with a representation of a geographic area, wherein the localized region comprises a high degree of non-linearity;
determine a vertical maximum point and a vertical minimum point on the perimeter of the localized region;
determine a horizontal maximum point and a horizontal minimum point on the perimeter of the localized region;
determine an enclosure region for each of the at least one localized regions, the enclosure region comprising an enclosure perimeter around the at least one localized region, the enclosure perimeter comprising the vertical maximum point, the vertical minimum point, the horizontal maximum point, and the horizontal minimum point;
determine the user device is located within the enclosure region and outside of the localized region enclosed by the enclosure region;
implement protocols to receive or send the information related to the localized region when the user device is determined to be within the enclosure region and outside of the localized region enclosed by the enclosure region; and
cause to generate a map on the user device, wherein the map comprises:
a first image associated with the user device,
a second image associated with the localized region, and
a third image associated with the enclosure region.

2. The system of claim 1, further comprising computer-executable instructions to:
   determine the user device is located outside of the enclosure region; and
   cease the implementation of the protocols in response to determining the user device is determined to be outside of the enclosure region.

3. The system of claim 2, further comprising computer-executable instructions to:
   determine the user device is located inside of the enclosure region; and
   implement the protocols in response to determining the user device is determined to be inside of the enclosure region.

4. The system of claim 1, wherein the representation of the geographic area comprises a two dimensional representation, and the two dimensional representation comprises a vertical axis and a horizontal axis and the vertical maximum point comprises a first location on the perimeter of the at least one localized region, wherein any portion of the at least one localized region within the perimeter does not extend beyond the first location on the perimeter of the at least one localized region.

5. The system of claim 4, wherein the horizontal maximum point comprises a second location on the perimeter of the at least one localized region, wherein any portion of the at least one localized region within the perimeter does not extend beyond the second location of the perimeter of the at least one localized region.

6. The system of claim 4, wherein the vertical minimum point comprises a third location on the perimeter of the at least one localized region, wherein any portion of the at least one localized region within the perimeter does not extend below the third location on the perimeter of the at least one localized region.

7. The system of claim 3, wherein the horizontal minimum point comprises a fourth location on the perimeter of the at least one localized region, wherein any portion of the at least one localized region within the perimeter that does not extend below the fourth location on the perimeter of the at least one localized region.

8. The system of claim 1, wherein the enclosure perimeter of the enclosure region comprises four orthogonal sides, and the four orthogonal sides form a square or a rectangle that encloses the localized region.

9. The system of claim 1, wherein the localized region comprises an area including a business, a school, a retailer, a neighborhood, or a commercial zone.

10. One or more tangible computer-readable non-transitory storage media comprising computer-executable instructions operable to, when executed by at least one computer processor, enable the at least one computer processor to implement a method comprising:
   determining, using the at least one computer processor, one or more geographic regions that are used to enable a user device to receive or send information when the user device is located within at least one of the geographic regions, wherein the one or more geographic regions comprise a high degree of non-linearity;
   determining a multi-sided boundary that surrounds each of the one or more geographic regions, the multi-sided boundary comprising sides that are substantially perpendicular or substantially parallel to each other;
   determining a user device is located within the multi-sided boundary and outside of the geographic region enclosed by the multi-sided boundary;
   receiving or sending information at or from the user device when the user device is located within the multi-sided boundary and outside of the geographic region enclosed by the multi-sided boundary, the information being related to the geographic region; and
   cause to generate a map on the user device, wherein the map comprises:
      a first image associated with the user device,
      a second image associated with the localized region, and
      a third image associated with the enclosure region.

11. The one or more tangible computer-readable non-transitory storage media of claim 10, further comprising:
   determining the user device is located outside of the multi-sided boundary that surrounds the geographic region; and
   ceasing the sending, from the user device, of the information related to the geographic region when the user device is detected outside of the multi-sided boundary.

12. The one or more tangible computer-readable non-transitory storage media of claim 10, further comprising:
   determining the user device is located inside of the geographic region; and
   maintaining the receiving or sending of the information when the user device is detected inside of the geographic region.

13. The one or more tangible computer-readable non-transitory storage media of claim 10, wherein the multi-sided boundary forms a four or more sided feature that encloses the geographic region.

14. The one or more tangible computer-readable non-transitory storage media of claim 13, wherein the four or more sided feature comprises a square or a rectangle.

15. The one or more tangible computer-readable non-transitory storage media of claim 10, wherein the geographic region comprises a designated area for a remote device to provide information to the user device when the user device is located within the designated area.

16. A device, comprising:
   at least one memory that stores computer-executable instructions;
   at least one radio;
   one or more antennas; and
   at least one computer processor that executes the computer-executable instructions to:
      determine, using the at least one computer processor, one or more geographic regions that are used to enable a user device to receive or send information when the user device is located within at least one of the geographic regions, wherein the one or more geographic regions comprise a high degree of non-linearity;
      determine a multi-sided boundary that surrounds each of the one or more geographic regions;
      determine a user device is located within the multi-sided boundary and outside of the geographic region enclosed by the multi-sided boundary;
      receive or send information at or from the user device when the user device is located within the multi-sided boundary and outside of the geographic region enclosed by the multi-sided boundary, the information being related to the geographic region; and
      cause to display a map on the user device, wherein the map comprises:
         a first image associated with the user device,
         a second image associated with the localized region, and a third image associated with the enclosure region.

17. The device of claim 16, further comprising computer-executable instructions to:
   determine the user device is located outside of the multi-sided boundary that surrounds the geographic region; and
   cease the sending, from the user device, of the information related to the geographic region when the user device is detected outside of the multi-sided boundary.

18. The device of claim 16, wherein the determining of the multi-sided boundary further comprises computer-executable instructions to:
   determine at least four coordinate points that each indicate a maximum vertical displacement, a maximum horizontal displacement, a minimum vertical displacement, or a minimum horizontal displacement of the geographic region within at least a two dimensional plane; and
   determine intersections between lines extended from the four coordinate points along a vertical or a horizontal axis, the multi-sided boundary being formed, at least in part, on the intersections and the lines that form a perimeter around the geographic region.

19. The device of claim 18, wherein the intersections of the lines form a square or rectangle around the geographic region.

20. The device of claim 16, wherein the information comprises information to a business that has a physical presence within the geographic area.

\* \* \* \* \*